3,015,853
PROCESS FOR HEAT-TREATING MOLDED COMPOSITIONS

David D. Munsell, Manchester, and William M. Jackson II, Woburn, Mass., assignors to Cabot Corporation, Boston, Mass., a corporation of Delaware
No Drawing. Filed Mar. 9, 1959, Ser. No. 797,879
7 Claims. (Cl. 18—48)

This invention relates to curing molded polymeric compositions and in particular to heat-treating molded thermoplastic compositions which do not possess form-stability at temperatures at which the heat treatment is to be effected.

It is known that polymeric compositions comprising a polymer of a mono-olefinic hydrocarbon and a curing agent can be readily injection molded at economic rates on currently available industrial equipment if the temperature of the composition during the injection molding operation is maintained below the activation temperature of the curing agent. Maintaining the temperature of the composition below said activation temperature is necessary because otherwise premature curing will take place in the injection molding apparatus and concomitant fouling of and damage to the apparatus will inevitably result. Accordingly, heretofore, curing was often accomplished subsequent to the injection molding operation but while the molded article was still in the mold, since uncured compositions of the type in question are thermoplastic and do not possess form-stability at the temperatures required for curing. The curing operation involved the time consuming steps of heating the mold to accomplish curing and subsequently allowing the mold to cool sufficiently to permit the cured article to be ejected from the mold without damage thereto. This process was most disadvantageous because the curing operation and the subsequent cooling of the mold prior to ejection of the article involved a relatively lengthy period of time, and uneconomic production rates resulted.

In the present invention, this disadvantage of the prior art has been completely circumvented.

Accordingly, it is a principal object of this invention to provide an improved process for curing curable thermoplastic molded compositions.

Another object of the present invention is to provide a novel process for curing molded articles which do not possess form-stability at curing temperatures until cure has been effected.

Another object of the present invention is to provide a novel process whereby uncured injection molded articles which do not possess form-stability at curing temperatures can be readily cured subsequent to ejection from the molds of the injection molding apparatus.

Still another object of the present invention is to provide an improved process for producing cured molded articles from compositions comprising a polymer or copolymer or mixtures thereof of a mono-olefinic hydrocarbon and a curing agent.

Other objects will in part be obvious and will in part appear hereinafter.

In accordance with the present invention, it was discovered that if a curable molded composition which does not possess form-stability at curing temperatures is packed in an inert finely-divided form-supporting material such as foundry sand containing a small quantity of binder, such as bentonite, the molded article can then be heated to and maintained at curing temperatures until curing is effected without the occurrence of any form deformation in the cured product.

In general the present invention is applicable to molded compositions which are to be heat treated but which do not possess form-stability at the temperatures at which heat-treatment is to be achieved. The present invention, however, is most advantageous when applied to the curing of curable thermoplastic molded polymeric compositions, and in particular, to the curing of curable compositions comprising a polymer, copolymer or mixture thereof of a mono-olefinic hydrocarbon, a filler and a curing agent.

In addition to foundry sand, other inert finely-divided (that is having an average particle size of less than about 35 mesh), form-supporting materials suitable for the purposes of the present invention are wall tile bodies, wollastonite, talc, metal oxides such as alumina, and silica and the like.

In addition to the binder, bentonite, specifically mentioned above, many other binders which are generally suitable for use at the temperatures encountered in the present invention, that is generally not above about 450–500° F. are in general suitable for the purposes of the present invention. Examples of such binders are "Carbowax," produced by Union Carbide, cellulose binders such as "Methylcel" and "Sodium Carboxyl-Methyl Cellulose," produced by Harshaw Chemical Company and high viscosity polyethylene glycols in general. Of course, the proportion of binder to supporting material is not critical and may vary with the specific binder utilized.

The specific curing agents utilized in the present invention are not in themselves critical. Any of the curing agents which are suitable for curing polymeric materials of the type mentioned above are in general useful as curing agents for the purposes of the present invention. For example, organic peroxides which contain the hydrogen group (O—O—H) or in which both oxygen atoms of the peroxy group (O—O—) are joined to organic radicals are suitable for the purposes of the present invention. The organic radicals in these peroxides may be selected from the class consisting of alkyl, cycloalkyl, aryl, aralkyl, acyl, alkenyl, cycloalkenyl, and any such groups bearing substituent groups which do not render the peroxide dangerously unstable or so excessively stable that it will not decompose upon the application of that amount of heat which can safely be tolerated by the polymer. For example, alkyl, cycloalkyl, aryl, aralkyl, halogen, hydroxyl, alkoxy, aryloxy, carboxy, nitro and peroxy groups are all generally suitable substituents, at least individually.

Also suitable for use as curing agents in the process of the present invention are the quinone oximes and the quinone oxime derivatives disclosed in copending U.S. patent applications Serial Nos. 767,756, now abandoned, and 767,776 of D. B. Smith and James C. MacKenzie, filed October 17, 1958.

Included within the scope of this invention and generally preferred are compositions as described above containing in addition substantial proportions of fillers. Fillers suitable for the practice of this invention are those commonly employed as reinforcing agents in polymeric compositions of the disclosed type. Thus, any finely-divided inorganic pigments such as carbon black, metal oxides, wood flour, wollastonite, kaolin clays, and the like are satisfactory.

In a typical example of the procedure to be followed in accordance with the present invention, an uncured thermoplastic composition is molded, for example, by being injection molded into a desired shape. The molded composition is first securely and completely embedded in a supporting material such as foundry sand containing a small amount of binder. The completely imprisoned article is then heated to curing temperatures (at which temperatures the composition is in the plastic or fluid state), for example, by being placed in an oven or by high frequency heating, and maintained at curing temperatures for a sufficient length of time to permit curing to take place. Subsequently, the now cured composition is removed from the oven, cooled, and the packing of supporting material removed therefrom, for example, by placing the imprisoned molded composition upon a vibrating screen. The cured molded composition is then conveyed away for storage or shipment and the packing material recovered for reuse.

There follows a number of non-limiting illustrative examples.

*Example 1*

A composition comprising 100 parts by weight of "Alathon 10," a polyethylene polymer produced by E. I. du Pont de Nemours & Company and having a density of 0.92, 100 parts of "Sterling" medium thermal carbon black produced by Godfrey L. Cabot, Inc., and 2.7 parts of technical grade dicumyl peroxide, an aralkyl peroxide curing agent produced by Hercules Powder Company was injection molded into a standard 1½ inch pipe cap. Foundry sand, containing about 2% bentonite as a binder, was then packed tightly against the inside and outside surfaces of the pipe cap. The sand-packed pipe cap was then cured by being placed into a gas-fired oven heated to an average of about 350° F. for about 50 minutes. Following curing, the sand-packed pipe cap was removed from the oven and allowed to cool. The packing of sand was then removed. The cured pipe cap had retained its original shape; the threads inside the pipe cap were distinct and undeformed. A sample was removed from the pipe cap and extracted in diethylbenzene for 4 hours (the original uncured polymer completely dissolves in diethylbenzene in just 2 hours). The cured composition was found to be about 75% undissolved on the polymer basis.

*Example 2*

The composition of Example 1 was injection molded into a round wafer-like disk about 1½ inches in diameter. Wall tile body, in particulate form, comprising by weight about 70% wollastonite, and 30% ball clay was then packed tightly about this disk. The imprisoned disk was then cured by being placed in an electrically-fired oven heated to an average of about 360° F. for about 15 minutes. Following curing the imprisoned disk was removed from the oven and allowed to cool. The packing of wall tile body was then removed. The cured article had retained its original shape. Whereas a similar uncured molded disk could be easily bent and broken, this cured disk could be bent almost double without breaking.

In one embodiment of the invention, an uncured molded article is embedded in the supporting material by being dipped into a slurry comprising a vehicle, such as water, the inert finely-divided supporting material, and a small quantity of binder. After removal from the slurry, the "casing" on the article is dried. Subsequently the article is heat treated or cured as described above while so encased.

Obviously, many changes may be made in the above specifically disclosed formulations without departing from the scope of the invention. For example, in addition to polyethylene, polypropylene and polybutene, other mono-olefinic polymers and copolymers and mixtures thereof can also be utilized in the practice of this invention.

Also, obviously the present invention readily lends itself to continuous operation. For example, in one embodiment of the present invention, the uncured molded articles are placed on a properly designed conveyor belt with an appropriate supporting material for example foundry sand and a binder, so that the molded articles are completely covered with the sand. The foundry sand is then compressed securely about the molded articles as the conveyor belt carries them through one or more rollers. The articles, now completely and securely embedded in foundry sand, are conveyed into an oven heated to temperatures well above curing temperatures. After remaining in the oven sufficiently long to effect curing, the articles are conveyed from the oven and dropped upon a vibrating screen, through which the sand sifts as it is stripped from the cured articles. The molded articles are then conveyed away and the sand recovered for reuse.

It is therefore intended that the above disclosure be regarded as illustrative and as in no way limiting the scope of this invention.

What we claim is:

1. A process for curing a curable molded α-mono-olefinic polymer composition which does not possess form stability at temperatures at which it is to be cured, which comprises embedding said molded composition in an inert finely divided supporting material containing a minor portion of a binder suitable for use at temperatures up to about 500° F. and heating said molded composition while embedded in said supporting material to curing temperatures.

2. The process of claim 1 wherein said binder comprises bentonite.

3. A process for curing a molded α-mono-olefinic polymer composition which does not possess form stability at temperatures at which it is to be cured, said composition comprising a substance chosen from the group consisting of the polymers and copolymers of the α-mono-olefinic hydrocarbons and mixtures thereof, a filler and a curing agent chosen from the group consisting of organic peroxides and quinone oximes which process comprises embedding said molded composition in an inert finely divided supporting material containing a minor portion of a binder suitable for use at temperatures up to about 500° F. and subjecting said embedded composition to curing temperatures.

4. The process of claim 3 wherein said filler comprises carbon black.

5. A process for curing a molded polyethylene composition which is in a highly plastic state at temperatures at which it is to be cured, said composition comprising polyethylene, a filler chosen from the group consisting of carbon black, metal oxides, wood flour, wollastonite and kaolin clays, and a curing agent chosen from the group consisting of organic peroxides and quinone oximes which process comprises embedding said molded composition in an inert finely divided supporting material chosen from the group consisting of foundry sand, wollastonite, talc, silica and metal oxides and containing a minor portion of a binder suitable for use at temperatures up to about 500° F. and subjecting said embedded composition to curing temperatures.

6. The process of claim 5 wherein said binder comprises bentonite.

7. A process for curing a molded polyethylene composition which is in a highly plastic state at temperatures at which it is to be cured, said composition comprising polyethylene, carbon black and a curing agent chosen from the group consisting of organic peroxides and quinone oximes, which process comprises embedding said molded composition in an inert finely divided supporting material chosen from the group consisting of foundry sand, wollastonite, talc, silica and metal oxides and a minor portion of a binder comprising bentonite, and subjecting said embedded composition to curing temperatures.

References Cited in the file of this patent

UNITED STATES PATENTS

| | | |
|---|---|---|
| 1,379,366 | Seabury | May 24, 1921 |
| 2,148,133 | Reaschler | Feb. 21, 1939 |
| 2,529,041 | Muller | Nov. 7, 1950 |